(12) United States Patent
Ayvaz et al.

(10) Patent No.: US 9,218,462 B2
(45) Date of Patent: Dec. 22, 2015

(54) AUTHENTICATION USING LIGHTS-OUT MANAGEMENT CREDENTIALS

(75) Inventors: Cemil J Ayvaz, Houston, TX (US); Jorge Daniel Cisneros, Houston, TX (US); Lee A Preimesberger, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 146 days.

(21) Appl. No.: 13/455,467

(22) Filed: Apr. 25, 2012

(65) Prior Publication Data
US 2013/0291064 A1    Oct. 31, 2013

(51) Int. Cl.
*H04L 29/06* (2006.01)
*G06F 21/00* (2013.01)

(52) U.S. Cl.
CPC ...................................... *G06F 21/00* (2013.01)

(58) Field of Classification Search
USPC ............................................................ 726/4
See application file for complete search history.

(56) References Cited

U.S. PATENT DOCUMENTS

| | | | | |
|---|---|---|---|---|
| 6,408,389 B2 * | 6/2002 | Grawrock et al. | ............ | 713/183 |
| 7,035,857 B2 * | 4/2006 | Reeves et al. | ......................... | 1/1 |
| 7,047,558 B1 * | 5/2006 | Mariana | ............................. | 726/3 |
| 7,243,148 B2 * | 7/2007 | Keir et al. | ...................... | 709/224 |
| 7,260,726 B1 * | 8/2007 | Doe et al. | ....................... | 713/189 |
| 7,591,014 B2 * | 9/2009 | England et al. | ................. | 726/17 |
| 7,600,261 B2 * | 10/2009 | Wray | .............................. | 726/26 |
| 7,917,741 B2 * | 3/2011 | Dutton et al. | ..................... | 713/1 |
| 8,289,975 B2 * | 10/2012 | Suganthi et al. | ......... | 370/395.53 |
| 8,369,254 B2 * | 2/2013 | Sood et al. | .................... | 370/311 |
| 8,595,723 B2 * | 11/2013 | Garrett | ................ | G06F 9/44505 |
| | | | | 713/100 |
| 8,707,402 B1 * | 4/2014 | Worsley | .................. | G06F 21/57 |
| | | | | 726/4 |
| 8,756,667 B2 * | 6/2014 | Springfield | ............. | G06F 21/34 |
| | | | | 713/186 |
| 2002/0049744 A1 * | 4/2002 | Nakos et al. | ...................... | 707/1 |
| 2002/0162026 A1 * | 10/2002 | Neuman et al. | ............... | 713/201 |
| 2003/0084342 A1 * | 5/2003 | Girard | ................... | G06F 21/575 |
| | | | | 726/4 |
| 2004/0064457 A1 * | 4/2004 | Zimmer et al. | ............... | 707/100 |
| 2004/0073806 A1 * | 4/2004 | Zimmer | ................ | G06F 21/575 |
| | | | | 713/189 |
| 2004/0123161 A1 * | 6/2004 | Harada et al. | ................. | 713/202 |
| 2004/0153438 A1 * | 8/2004 | Rossiter et al. | .................... | 707/1 |
| 2005/0071677 A1 * | 3/2005 | Khanna | ................. | G06F 21/575 |
| | | | | 726/4 |
| 2005/0129035 A1 * | 6/2005 | Saito | ............................ | 370/401 |
| 2005/0138409 A1 * | 6/2005 | Sheriff et al. | ................. | 713/200 |

(Continued)

FOREIGN PATENT DOCUMENTS

WO    WO 2006/028651 A2    3/2006

OTHER PUBLICATIONS

Sun Microsystems, "Using the ALOM Command Shell", Sun Microsystems, 2006, entire document, http://docs.oracle.com/cd/E19088-01/v125.srvr/819-2445-11/command_shell.html#42455.*

(Continued)

*Primary Examiner* — Christopher Brown
*Assistant Examiner* — Ronald Baum
(74) *Attorney, Agent, or Firm* — Pearl Cohen Zedek Latzer LLP

(57) ABSTRACT

A method includes upon receiving a request from a user to perform an operation on a device that is running under an operating system, authenticating the user on the basis of credential data that is retrieved from a data storage unit that is associated with a lights-out management (LOM) capability of the device. If authentication of the user is successful, the user is enabled to perform the operation.

18 Claims, 4 Drawing Sheets

(56) References Cited

U.S. PATENT DOCUMENTS

| | | | |
|---|---|---|---|
| 2006/0156054 A1* | 7/2006 | Brown et al. | 714/4 |
| 2007/0118654 A1* | 5/2007 | Jamkhedkar et al. | 709/226 |
| 2007/0168048 A1* | 7/2007 | Allen et al. | 700/2 |
| 2007/0206630 A1* | 9/2007 | Bird | 370/465 |
| 2008/0140819 A1* | 6/2008 | Bailey | G06F 13/385 709/223 |
| 2009/0006859 A1* | 1/2009 | Zimmer et al. | 713/186 |
| 2009/0319806 A1* | 12/2009 | Smith et al. | 713/193 |
| 2010/0275251 A1* | 10/2010 | Gross et al. | 726/6 |
| 2010/0333175 A1* | 12/2010 | Cox et al. | 726/3 |
| 2011/0083003 A1* | 4/2011 | Jaber | G06F 21/335 713/2 |
| 2011/0246773 A1* | 10/2011 | Sidle | G06F 21/305 713/168 |
| 2012/0151223 A1* | 6/2012 | Conde Marques et al. | 713/193 |
| 2013/0067534 A1* | 3/2013 | Soffer | 726/2 |
| 2013/0318577 A1* | 11/2013 | Bulusu | H04L 63/08 726/5 |
| 2013/0347089 A1* | 12/2013 | Bailey et al. | 726/7 |

OTHER PUBLICATIONS

Fujitsu, 'Integrated Lights Out Manager (ILOM) 3.0 Concepts Guide', Apr. 2009, Rev. A, Manual Code C120-E573-01 EN, entire document, http://www.fujitsu.com/downloads/SPARCE/manuals/sparc-t5e/ilom3.0-concept-en-01.pdf.*

Poole, C., 'Security and Configuration Consoles and Other Physical/Virtual Communication Ports', 2012,TDi Technologies, Inc., entire document, https://ics-cert.us-cert.gov/sites/default/files/ICSJWG-Archive/F2012/D2_PM2_Tr2_Poole_Serial%20Console%20Presentation.pdf.*

"Out of Band Network Management in the Data Center"; at: http://www.wti.com/t-wti-white-paper-oobdc.aspx.

"Overview of Out of Band Management"; Updated: Oct. 1, 2009; Microsoft System Center; at: http://technet.microsoft.com/en-us/library/cc161963.aspx.

K. Kawaguchi; "Distributed Builds"; Apr. 7, 2011; updated Apr. 4, 2012 by A. Morelle; at: https://wikijenkins-ci.org/display/JENKINS/Distributed+builds.

* cited by examiner

AUTHENTICATION USING LIGHTS-OUT MANAGEMENT CREDENTIALS

BACKGROUND

In a system that is configured for a lights-out management (LOM) or out-of-band (OOB) management capability, a device of the system may be operated remotely when the system device is powered down. For example, the lights-out management capability may be accessed by an authorized user via a data port of the system device. An authorized user may be authenticated by comparison of data (e.g. user name, identification, information, or password) that is provided by a user that is accessing device with credential data that is stored in a data storage device that is associated with the system device.

Many applications that run on a computing device, such as an operating system or network access, also require authentication of a user before permitting the user to access the application. For example, logging in to a network or communicating with the network may include application of a Secure Shell (SSH) protocol.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

DETAILED DESCRIPTION

Figure 1:
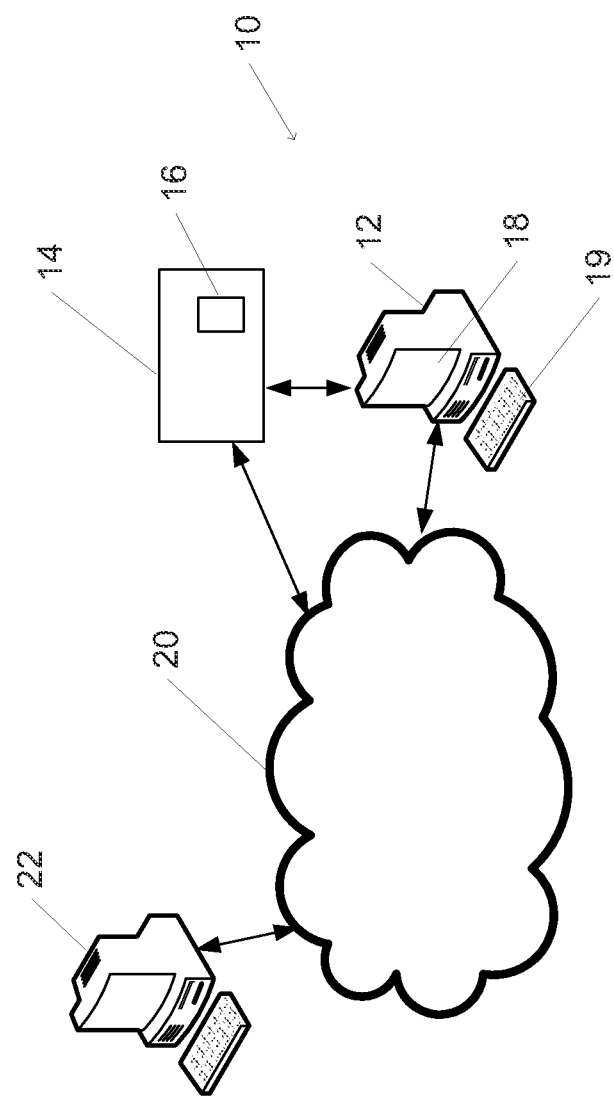
FIG. 1 is a schematic illustration of an example of a system for application of authentication using lights-out management (LOM) credentials.

In accordance with an example of authentication using lights-out management (LOM) credentials, a system device (e.g. a network server or other computer) may include credential-related data that is stored on a non-volatile data storage device that is associated with the system device. For example, the non-volatile data storage device may be associated with a lights-out management (LOM, alternatively known as out-of-band, OOB, management) capability of the system device. For example, an LOM capability may enable an authorized user operating a remote device (e.g. that is capable of communicating with the system device via a network) to access and operate at least some capabilities of the system device, even when the system device is shut down. For example, an LOM capability may enable the authorized user to remotely access and manipulate the system device without starting an operating system on the system device. Communication between the remote device and the system device may be in accordance with a communications protocol.

Data that is related to the credentials of the authorized user may be stored on the non-volatile data storage device that is associated with the system device. For example, a suitable non-volatile storage device may include a solid-state data storage device that may be accessible when an electrical power line to the system device is disconnected (main power turned off). For example, the non-volatile data storage device may be integrated into a circuit board (e.g. a mother board or separate LOM-related card) that is associated with the system device or with the LOM capability of the system device.

A user of a remote device that is attempting to interact with the system device via the LOM capability of the system device may be required to submit authentication data. For example, an application running on the remote device that communicates with the system device via the LOM capability may require the user to enter authentication data via a user interface. If the submitted authentication data is compatible with the credentials that are store on the non-volatile data storage device, the user may be allowed access to the system device via the LOM capability.

An application that is running on the system device may also require authentication of a user that is attempting to operate the system. For example, authentication or verification of a user's identity may be required when starting or restarting an operating system (e.g. Linux or Windows), connecting to a network (e.g. using a Secure Shell (SSH) protocol), or starting an application that runs under an operating system. In accordance with an example of authentication using out-of-band credentials, credentials used to authenticate the user (e.g. user name, permissions, password, public key), and that are stored in the non-volatile data storage device, may be shared. Thus, the stored credentials may be utilized by an LOM capability to authenticate a user, and by an application running under an operating system.

A system may be configured for authentication using LOM credentials. FIG. 1 is a schematic illustration of an example of a system for application of authentication using LOM credentials.

Figure 2:
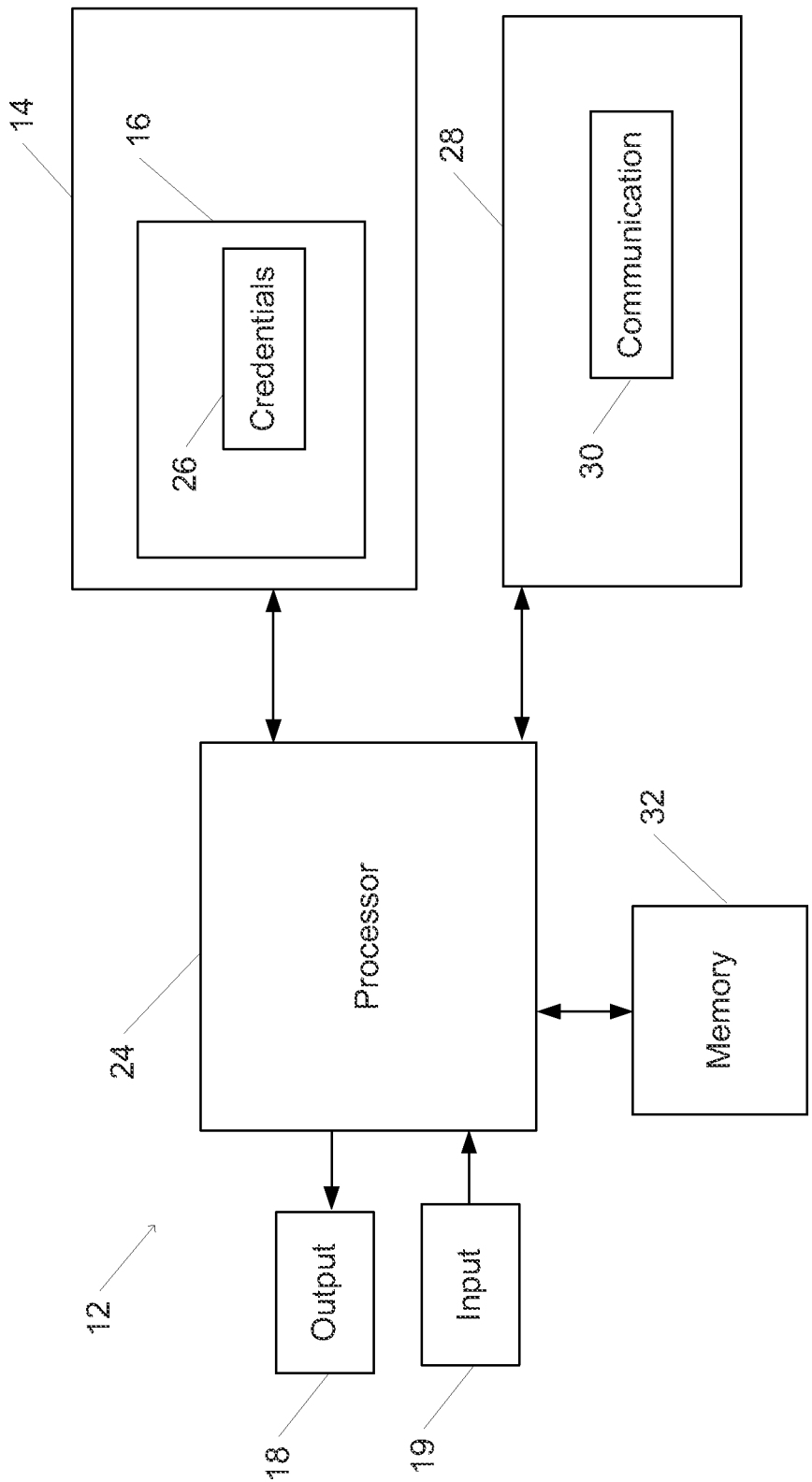
FIG. 2 is a schematic illustration of an example of a system device for application of authentication using LOM credentials.

System 10 for application of authentication using LOM credentials includes a system device 12. For example, system device 12 may represent a computer or server. FIG. 2 is a schematic illustration of an example of a system device for application of authentication using LOM credentials.

System device 12 may include one or more of a processor 24, a data storage device 28, or a memory 32. Processor 24 of system device 12 may be configured to operate in accordance with stored programmed instructions. Processor 24 of system device 12 may be capable of executing an application for authentication using LOM credentials. Processor 24 may include a single processor, or two or more intercommunicating data processing units.

Processor 24 may communicate with memory 32. Memory 32 may include one or more volatile or nonvolatile memory devices. Memory 32 may be utilized to store, for example, programmed instructions for operation of processor 24, data or parameters for use by processor 24 during operation, or results of operation of processor 24.

Processor 24 may communicate with data storage device 28. Data storage device 28 may include one or more fixed or removable nonvolatile data storage devices. For example, data storage device 28 may include a computer readable medium for storing program instructions for operation of processor 24. In this example, the programmed instructions may take the form of communications module 30 for communicating with LOM enabling unit 14. It is noted that storage device 28 may be remote from processor 24 or from system device 12. In such cases storage device 28 may be a storage device of a remote server storing communications module 30 in the form of an installation package or packages that can be downloaded and installed for execution by processor 24. Data storage device 28 may be utilized to store data or parameters for use by processor 24 during operation, or results of operation of processor 24.

Processor 24 may communicate with an output device 18. For example, output device 18 may include a computer monitor or screen. Processor 24 may communicate with a screen of output device 18 to display a user interface or a notification that is visible to a user. In another example, output device 18 may include a printer, display panel, speaker, or another device capable of producing visible, audible, or tactile output.

Processor 24 may communicate with an input device 19. For example, input device 19 may include one or more of a keyboard, keypad, or pointing device for enabling a user to inputting data or instructions for operation of system device 12 or processor 24.

Processor 24 may include or communicate with LOM enabling unit 14. For example, LOM enabling unit 14 may be incorporated into system device 12 as part of a circuit board (e.g. a computer mother board) or as a separate unit, device, or circuit board. LOM enabling unit 14 includes LOM data storage unit 16. For example, LOM data storage unit 16 may include a solid state or other non-volatile data storage device. LOM enabling unit 14 and LOM data storage unit 16 may be configured to operate on minimal electrical power (e.g. on electrical power stored in a battery or capacitor), such that LOM enabling unit 14 and LOM data storage unit 16 may operate when electrical power to system device 12 is turned off.

System device 12 may connect to network 20. For example, system device 12 may communicate via network 20 with one or more other devices or systems, such as remote device 22. For example, remote device 22 may include one or more of a processor or computer, an input device, or an output device.

LOM enabling unit 14 may be accessible via network 20, e.g. to remote device 22. LOM enabling unit 14 may connect to network 20 via a dedicated communications channel (e.g. a dedicated port or cable), or via a communications channel that is common to system device 12 and to LOM enabling unit 14.

An authorized user that operates remote device 22 may access system device 12 via LOM enabling unit 14. For example, an authorized user operating remote device 22 may provide identification data via a user interface that is running on remote device 22. The provided identification data may be authenticated in accordance with data that is stored in LOM data storage unit 16. For example, a user name or password provided by the user via remote device 22 may be compared to, or analyzed in light of, data that is stored in LOM data storage unit 16. Data that is stored in LOM data storage unit 16 may include data that indicates which permissions are granted to each authorized user. For example, an indicated permission may indicate whether or not the authorized user is permitted to perform a particular operation on system device 12.

Access to system device 12 via LOM enabling unit 14 may enable performance of operations on system device 12 when power to system device 12 is turned off, or when no operating system is running on system device 12. Such operations may include, for example, powering on system device 12, installing or starting up an operating system on system device 12, or modifying system firmware.

System device 12 may be configured to operate in a manner that requires authentication. For example, system device 12 may be configured to access network 20 using an SSH protocol. Thus, when communicating via network 20, system device 12 may be required to provide information that is related to data such as, for example, an authorized party identification or a public key, for establishing secure communications between system device 12 and another device, e.g. remote device 22. In accordance with an example of authentication using LOM credentials, credential data for providing such required information may be stored and retrieved from LOM data storage device.

For example, list of remote users or devices that are authorized to access system device 12 via LOM enabling unit 14 may partially or completely overlap a list of remote users or devices with which secure communication is authorized. Thus, single list of such authorized remote users or devices may be stored in LOM data storage unit 16. In this manner, a remote user or device may be entered once, thus enabling entry of such credential data only once.

In operation, system device 12 may execute a method for authentication using LOM credentials.

Figure 3:
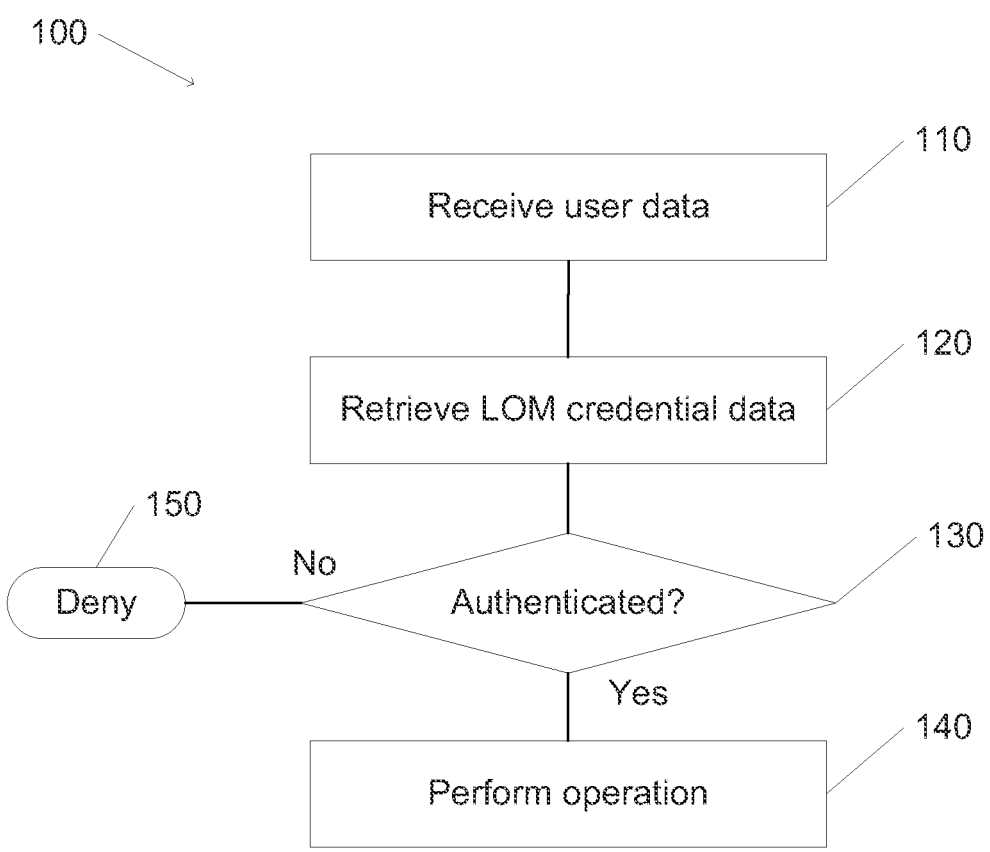
FIG. 3 is a flowchart depicting an example of a method for authentication using LOM credentials.

FIG. 3 is a flowchart depicting an example of a method for authentication using LOM credentials. Authentication method 100 may be executed by a processor of a system capable of authentication using LOM credentials. Authentication method 100 may be executed upon a request or command that is issued by a user, or automatically issued by another application.

It should be understood with respect to all flowcharts referenced herein that the division of an illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other examples of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other examples of the illustrated method.

Authentication method 100 may be executed when user data is received that requires authentication (block 110). For example, user data may be received when a user requests to perform an operation related to a system device of a system that implements authentication using LOM credentials. An appropriate application may be configured to authenticate the user and verify that the user is authorized to perform the operation.

LOM credential data may be received from an LOM data storage unit (block 120). For example, the LOM data storage unit may include a table of users and data related to the users. The data related to the users may include data that may be utilized to authenticate a user or data that indicates whether the user is authorized to perform the requested operation.

The user data may be compared with the LOM credential data to verify whether the user data is authenticated (block 130). For example, authentication may verify the user's identity and may indicate if the user is authorized to perform the requested operation.

If the user data is authenticated, the operation may be performed (block 140). For example, the user may be granted access to data stored by the system device, to communicate with the system device, or to perform an operation on the system device.

If the user data is not authenticated, the request to perform the operation is denied (block 150). A notification may be sent to the user of the denial.

Figure 4:
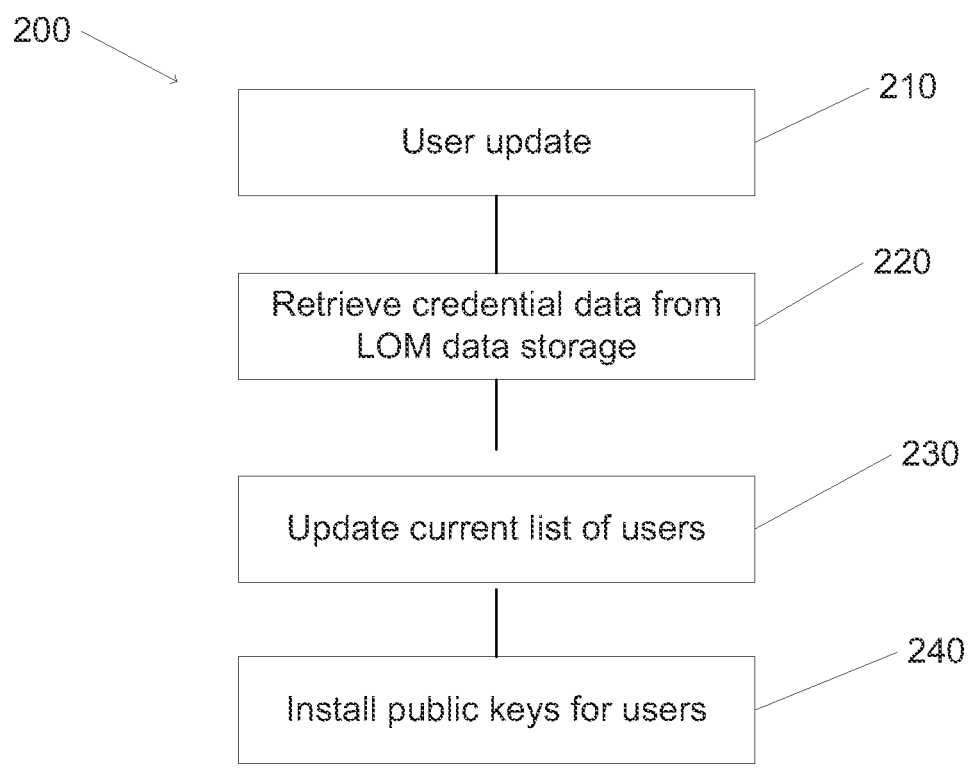
FIG. 4 is a flowchart depicting an example of application of a method for authentication using LOM credentials to communication using an SSH protocol.

A particular example of application of authentication method 100 may be applied with respect to secure communications, e.g. via an SSH protocol. FIG. 4 is a flowchart depicting an example of application of a method for authentication using LOM credentials to communication using an SSH protocol.

SSH authentication method 200 may be executed when user data for SSH communication is to be updated (block 210). For example, user data may be updated when an operating system on a system device (e.g. a server) is booted or initialized, at predetermined or periodic intervals, in response to a predetermined condition, or upon a user request.

Credential data may be retrieved from an LOM data storage unit (block 220). For example, the credential data may be in the form of a table. Credential data in the table may include user identification data associated with a list of public keys for use in secure communications with each of the users.

A list of users that are authorized to securely communicate with the system device may be updated in accordance with the retrieved data (block 230). For example, the credential data stored on the LOM data storage unit may be updated whenever a new user receives authorization to securely communicate with the system device, or when authorization is cancelled for a user. A current list of users that is utilized by the system device, e.g. in a memory that is associated with the system device, may be updated in accordance with the retrieved credential data. For example, a user appears in the credential data table but not in the current list may be added to the current list. A user that appears in the current list but not in the credential data may be removed from the current list.

Public keys for the users in the current list may be installed (block 240). Installing the public keys may enable secure communications (e.g. via an SSH protocol) between the system device and each user that is associated with an installed public key.

In accordance with an example of a method for authentication using LOM credentials, a computer program application stored in a computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as an example of a method for a method for authentication using LOM credentials. The computer-readable medium may be a non-transitory computer-readable media including all forms and types of computer-readable media except for a transitory, propagating signal.

We claim:

1. A method comprising:
receiving a first request by a user, the first request being received over a network by a light-out management (LOM) enabling unit, the first request being received while a host server hosting the LOM enabling unit is in a powered-down state;
in response to receiving the first request, retrieving, by the LOM enabling unit, a LOM credential from a LOM data storage unit of the LOM enabling unit, wherein LOM credentials indicate which permissions are granted to each user from a group of users, and wherein users are added, removed, or both, from the group of users;
authenticating, by the LOM enabling unit, the user based on the LOM credential from the LOM data storage unit, wherein the LOM data storage unit includes a current table of users, and wherein the current table of users is modified upon booting a host server operating system;
upon authentication of the user in response to the first request, the LOM enabling unit fulfilling or enabling the user to fulfill the first request;
powering up the host server hosting the LOM enabling unit after fulfilling the first request;
receiving, by an application executing on the host server using a processor that is separate from the LOM enabling unit, a second request from the user to perform an operation, wherein the second request is different from the first request;
in response to receiving the second request, retrieving, by the application, the LOM credential from the LOM data storage unit;
authenticating, by the application, the user based on the LOM credential that is retrieved from the LOM data storage unit; and
upon authentication of the user in response to the second request, the application fulfilling or enabling the user to fulfill the second request.

2. The method of claim 1, wherein the LOM credential includes data of a type selected from a group of credential data types consisting of: user identification, password, permission, and a public key.

3. The method of claim 1, wherein authenticating the user includes modifying on the basis of the retrieved LOM credential, the current table of users that are authorized to perform the operation.

4. The method of claim 3, wherein modifying the current table of users includes adding a user to the current table of users when that user is not included in the current table of users and the retrieved credential data indicates that the user is authorized to perform the operation.

5. The method of claim 3, wherein modifying the current table of users includes removing a user from the current table of users when that user is included in the current table of users and the retrieved credential data does not indicate that the user is authorized to perform the operation.

6. The method of claim 1 further comprising issuing a notification if the authentication of the user is not successful.

7. The method as recited in claim 1 wherein the operation is selected from a set consisting of starting an operating system, restarting the operating system, starting an application that runs under the operating system, and connecting to a network using a secure-shell protocol.

8. A non-transitory computer-readable storage medium having stored thereon instructions that when executed by hardware will cause the hardware to perform the method of:
receiving a first request by a user, the first request being received over a network by a lights-out management (LOM) enabling unit, the first request being received while a host server hosting the LOM enabling unit is in a powered-down state;
in response to receiving the first request, retrieving, by the LOM enabling unit, a LOM credential from a LOM data storage unit of the LOM enabling unit, wherein LOM credentials indicate which permissions are granted to each user from a group of users, and wherein users are added, removed, or both, from the group of users;
authenticating, by the LOM enabling unit, the user based on the LOM credential from the LOM data storage unit, wherein the LOM data storage unit includes a current table of users, and wherein the current table of users is modified upon booting a host server operating system;
upon authentication of the user in response to the first request, the LOM enabling unit fulfilling or enabling the user to fulfill the first request;

powering up the host server hosting the LOM enabling unit after fulfilling the first request;

receiving, by an application executing on the host server and not executing on the LOM enabling unit, a second request from the user to perform an operation, wherein the second request is different from the first request;

in response to receiving the second request, retrieving the LOM credential from the LOM data storage unit;

authenticating, by the application, the user based on the LOM credential; and upon authentication of the user in response to the second request, the application performing or enabling performance of the operation.

9. The non-transitory computer-readable storage medium of claim 8, wherein the credential data includes data of a type selected from a group of credential data types consisting of: user identification, password, permission, and a public key.

10. The non-transitory computer-readable storage medium of claim 8, wherein authenticating the user includes modifying on the basis of the retrieved LOM credential, the current table of users that are authorized to perform the operation.

11. The non-transitory computer-readable storage medium of claim 10, wherein modifying the current table of users includes adding a user to the current table of users when that user is not included in the current table of users and the retrieved LOM credential indicates that the user is authorized to perform the operation.

12. The non-transitory computer-readable storage medium of claim 10, wherein modifying the current table of users includes removing a user from the current table of users when that user is included in the current table of users and the retrieved LOM credential does not indicate that the user is authorized to perform the operation.

13. The non-transitory computer-readable storage medium of claim 8, comprising issuing a notification if the authentication of the user is not successful.

14. A system comprising a host server and a lights-out management (LOM) enabling unit, the LOM enabling unit being hosted by the host server, wherein:

the LOM enabling unit includes a LOM data storage component for storing a LOM credential for use in authenticating a user while the host server is in a powered down state;

the host server including a processing unit and a computer-readable medium, the processing unit being separate from the LOM enabling unit and running under an operating system, wherein the computer-readable medium contains a set of instructions that, when executed by the processing unit, cause the processing unit to:

receive a request from a user to cause the processing unit to perform an operation when the host server is in the powered down state;

retrieve the LOM credential from the LOM data storage component, wherein the LOM enabling unit is configured to use the LOM credential to authenticate the user to access the LOM enabling unit, wherein LOM credentials indicate which permissions are granted to each user from a group of users, and wherein users are added, removed, or both, from the group of users;

authenticate the user on the basis of the retrieved LOM credential from the LOM data storage component, wherein the LOM data storage component includes a current table of users, and wherein the current table of users is modified upon booting a host server operating system; and upon authentication of the user in response to the request, enable the user to perform the operation.

15. The system of claim 14, wherein the processing unit is configured to communicate with a remote device via a network.

16. The system of claim 15, wherein the processing unit is configured to communicate via the network using a Secure Shell (SSH) protocol.

17. The system of claim 16, wherein the processing unit is configured to obtain a public key from the retrieved LOM credential to enable communication via the SSH protocol.

18. The system of claim 14, wherein the LOM credential includes data of a type selected from a group of credential data types consisting of: user identification, password, permission, and a public key.

* * * * *